United States Patent [19]

Asaka

[11] 4,099,492
[45] Jul. 11, 1978

[54] MIXTURE CORRECTION SYSTEM DURING RAPID ACCELERATION IN INTERNAL COMBUSTION ENGINE WITH AUXILIARY COMBUSTION CHAMBER

[75] Inventor: Urataro Asaka, Kamifukuoka, Japan

[73] Assignee: Honda Giken Kogyo Kabushiki Kaisha, Tokyo, Japan

[21] Appl. No.: 763,851

[22] Filed: Jan. 31, 1977

[30] Foreign Application Priority Data

Feb. 4, 1976 [JP] Japan .................................. 51-10266

[51] Int. Cl.² .................. F02B 3/00; F02B 19/10; F02B 19/16
[52] U.S. Cl. ............... 123/32 ST; 123/75 B; 123/32 EA; 123/32 EH; 123/124 R; 123/DIG. 4; 123/127; 261/23 A; 261/23 B; 261/41 D; 261/DIG. 5
[58] Field of Search ............ 123/32 ST, 75 B, 127 R, 123/124 R, DIG. 4, 32 EH, 32 EA; 261/DIG. 19, 23 A, 121 A, 41 D, 23 B, 34 B, 39 A

[56] References Cited

U.S. PATENT DOCUMENTS

| | | | |
|---|---|---|---|
| 3,830,206 | 8/1974 | Asaka et al. ................. | 123/75 B |
| 3,933,134 | 1/1976 | Yagi et al. ................... | 123/75 B |
| 3,977,380 | 8/1976 | Atsumi et al. ................ | 123/32 ST |
| 3,982,507 | 9/1976 | Asaka et al. ................. | 123/75 B |
| 3,982,513 | 9/1976 | Nakagawa et al. ............ | 123/124 R |
| 3,994,268 | 11/1976 | Okunishi et al. ............. | 123/32 ST |
| 4,014,960 | 3/1977 | Goto et al. ................... | 123/32 ST |
| 4,015,572 | 4/1977 | Leshner et al. ............... | 123/32 ST |
| 4,018,856 | 4/1977 | Hamakawa et al. .......... | 123/32 ST |
| 4,060,573 | 11/1977 | Mori et al. ................... | 123/32 ST |

Primary Examiner—Wendell E. Burns
Attorney, Agent, or Firm—Lyon & Lyon

[57] ABSTRACT

An internal combustion engine has a main combustion chamber and an auxiliary combustion chamber associated with each piston and connected by a torch opening. A lean mixture is supplied to the main combustion chamber and a rich mixture is supplied to the auxiliary combustion chamber. After compression, ignition of the mixture in the auxiliary combustion chamber projects a flame through the torch opening to burn the lean mixture in the main combustion chamber. In order to prevent an over-rich mixture developing in the auxiliary combustion chamber upon rapid acceleration of the engine, correction devices and systems are employed to reduce the ratio of air intakes or to supply secondary air during such rapid acceleration. Such correction systems and devices may be rendered inoperative during initial startup of the engine.

17 Claims, 11 Drawing Figures

MIXTURE CORRECTION SYSTEM DURING RAPID ACCELERATION IN INTERNAL COMBUSTION ENGINE WITH AUXILIARY COMBUSTION CHAMBER

This invention relates to internal combustion piston engines in which each main combustion chamber is associated with an auxiliary combustion chamber and connected thereto by a torch opening. A lean mixture is supplied to the main combustion chamber and a rich mixture is supplied to the associated auxiliary combustion chamber. After compression, the mixture in the auxiliary chamber is ignited by a spark plug and this causes a flame to project through the torch opening to ignite the lean mixture in the main combustion chamber.

It has been found that engines of this type may sometimes exhibit misfire, poor driveability and excessive discharge of pollutants into the atmosphere whenever the engine is suddenly accelerated. It has been found that these difficulties arise because of an excessively rich mixture in the auxiliary chamber at the time of spark ignition at the end of the compression stroke.

In accordance with this invention, the problem is solved by reducing the ratio of air intakes to the auxiliary combustion chamber as compared to the main combustion chamber, or by introducing secondary air, during the period of rapid acceleration of the engine. Devices and systems for carrying out this mixture correction appear hereinafter, as well as means for rendering such devices and systems inoperative during cranking operations of the engine.

Other and more detailed objects and advantages will appear hereinafter.

Figure 3:
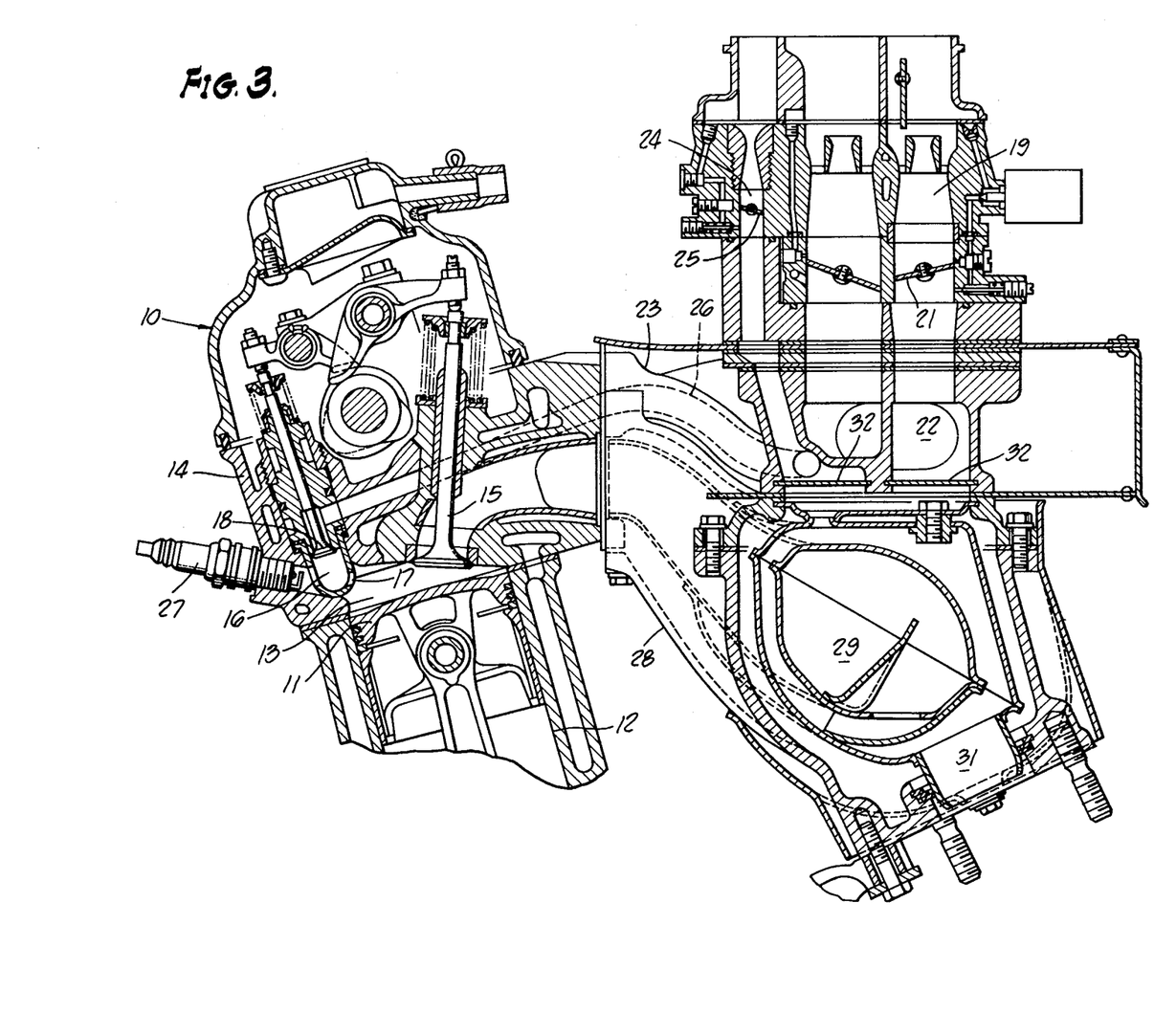
FIG. 3 is a sectional side elevation of a carbureted internal combustion engine of the type to which this invention is applicable.

Referring to the drawings, the internal combustion engine generally designated 10 has one or more pistons 11 each reciprocating in a cylinder bore 12. A main combustion chamber 13 is defined between the engine head 14 and each piston 11. Each main combustion chamber is provided with an exhaust valve 15 and an intake valve (not shown). An auxiliary combustion chamber 16 is positioned adjacent each main combustion chamber 13 and is connected thereto by means of a torch opening 17. The auxiliary combustion chamber 16 is provided with an inlet valve 18.

In the general plan of operation of an engine of this type, a lean air-fuel mixture is formed in the carburetor throat 19 and, after passing the main throttle valve 21, flows through a main intake passage 22 in the intake manifold 23 and past the main intake valve (not shown) into the main combustion chamber 13. At the same time a relatively rich air-fuel mixture passes through the auxiliary carburetor throat 24, controlled by the auxiliary throttle valve 25 and into the auxiliary intake passage 26. The rich mixture then passes the auxiliary intake valve 18 to reach the auxiliary combustion chamber 16. During the suction stroke of the piston 11, rich mixture is drawn through the auxiliary combustion chamber 16 and through the torch opening 17 and into the main combustion chamber 13. On the subsequent compression stroke of the piston 11, all of the valves being closed, reverse flow occurs through the torch opening 17 to bring the mixture in the auxiliary combustion chamber 16 to a value near stoichiometric. The spark plug 27 then ignites the mixture in the auxiliary combustion chamber 16, causing a flame to pass through the torch opening 17 to ignite the relatively lean mixture in the main combustion chamber 13. During the exhaust stroke of the piston 11 the exhaust valve 15 is open and hot gases flow into the exhaust manifold 28 and into the exhaust chamber 29 before leaving through outlet 31 and tail pipe (not shown). The heat of the exhaust gases is used to heat the lean mixture from carburetor throat 19 and rich mixture from carburetor throat 24 by means of heat transfer plate 32, in order to insure complete vaporization of the two intake mixtures.

Figure 4:
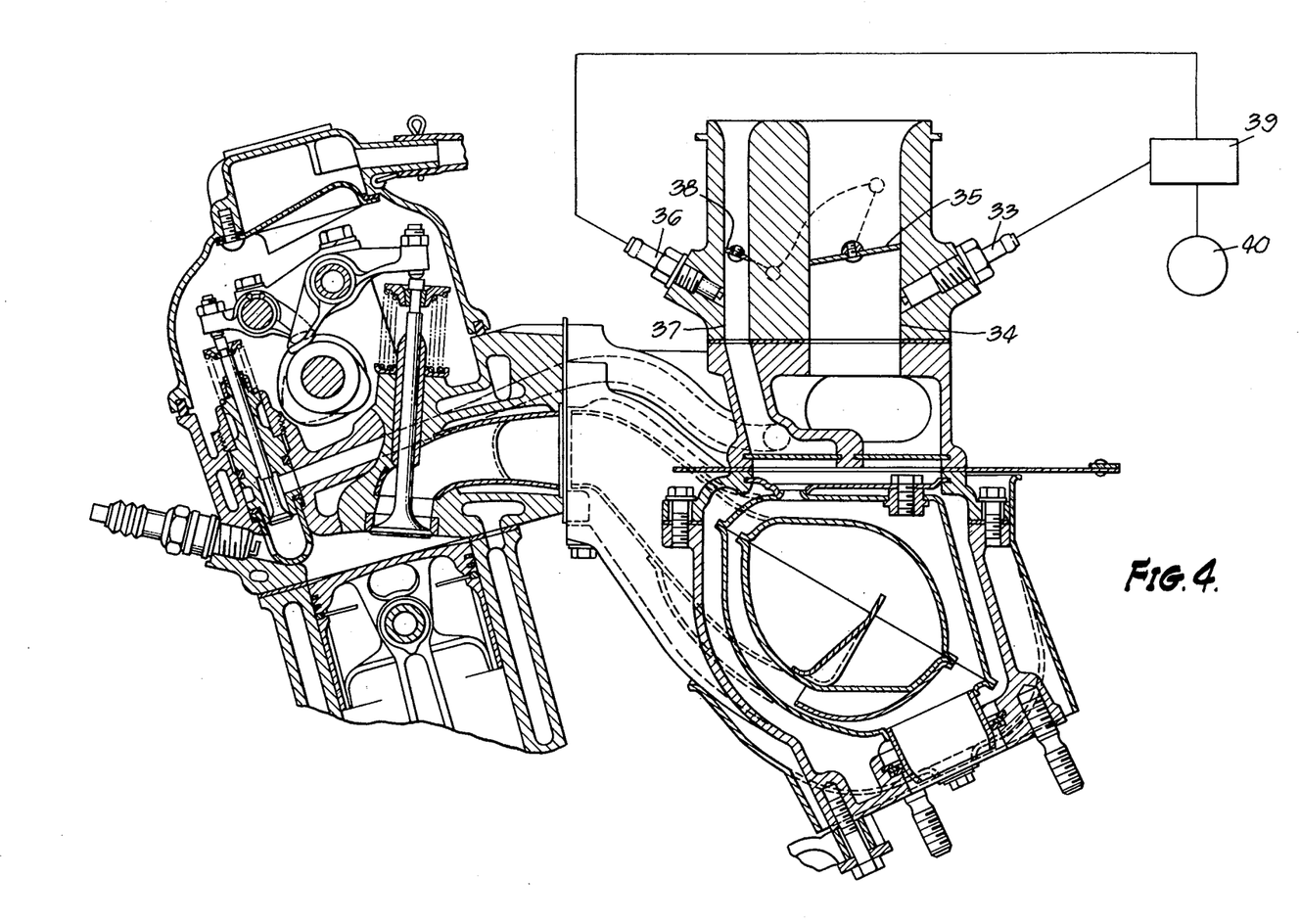
FIG. 4 is a view similar to FIG. 3 and showing a similar engine except that fuel injection, instead of carburetion is employed.

FIG. 4 shows an engine of the type just described except that carburetors are not used and instead a main fuel injector 33 injects liquid fuel into the main air intake passage 34 downstream from the main throttle valve 35, and an auxiliary fuel injector 36 injects liquid fuel into the auxiliary air intake passage 37 downstream from the auxiliary throttle valve 38. In other respects, the construction and operation of the engine shown in FIG. 4 is similar to that shown in FIG. 3. The fuel injectors 33 and 36 receive liquid fuel from a fuel control device 39 connected to a fuel source 40 which includes a fuel injection pump, etc. (not shown).

Figure 1:
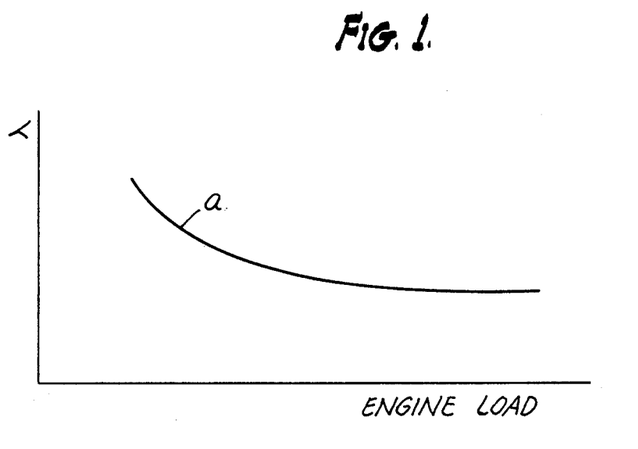
FIG. 1 is a diagram showing control characteristics of the ratio of air intakes for the type of engine described above.

In each of the engines described above, the main throttle valve and the auxiliary throttle valve are interconnected so that they operate in unison, but at different rates, because it is necessary for the air-fuel ratio of each of the two mixtures to be controlled as follows: The ratio λ between the auxiliary air intake introduced into the auxiliary combustion chamber and the main air intake introduced into the main combustion chamber is required to be gradually reduced as the engine load increases. This predetermined required relationship is shown by curve "a" in FIG. 1. This relationship is necessary so that when the engine is idling, the residual exhaust gases in the auxiliary combustion chamber at the end of the compression stroke, when mixed with the incoming rich mixture, do not bring about an unsatisfactory increase in the amount of unburned hydrocarbons in the exhaust. Also, the curve "a" shown in FIg. 1 represents engine operation which avoids unsatisfactory increase in $NO_x$ in the exhaust gases during high load operation of the engine. Thus, during idling, the spark ignitability is improved by performing sufficient scavenging of the auxiliary combustion chamber, and at high load operation the rate of flame propagation is retarded from the auxiliary combustion chamber to cause slower combustion in the main chamber.

Figure 2:
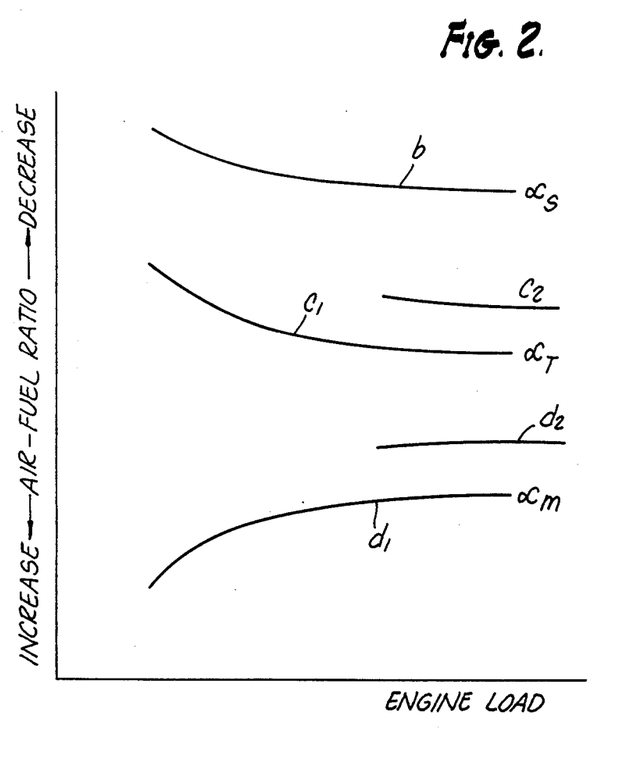
FIG. 2 is a diagram showing control characteristics of the air-fuel ratio of the lean mixture and rich mixture, for such an engine.

Furthermore, the air-fuel ratio $\alpha A$ of the rich mixture supplied to the auxiliary combustion chamber is required to be gradually increased, as shown by curve "$b$" in FIG. 2, as the load increases. The overall air-fuel ratio $\alpha_T$ of the total mixture supplied to both combustion chambers is required to gradually increase, as shown by curve "$c_1$" in FIG. 2 in the case of partial load, and as shown by curve "$c_2$" in the case of full load. As a result, air-fuel ratio $\alpha_M$ of the lean mixture supplied to the main combustion chamber is required to gradually decrease, as shown by curve "$d_1$" in FIG. 2 in the case of partial load, and as shown by curve "$d_2$" in the case of full load. This means that during idling of the engine, $\alpha A$ and $\alpha_T$ are made richer so as to increase the spark ignitability and to approve the combustion, while $\alpha_M$ for power output may be lean, since the engine load is small. Furthermore, during high load operation of the engine, because of the necessity of supplying the main combustion chamber with a mixture of good spark ignitability commensurate with increased output, $\alpha A$ should be made larger, $\alpha_M$ smaller, and thus $\alpha_T$ larger.

If an engine of either of the types described above is operated under such control characteristics, rapid opening of the throttle valves to obtain rapid acceseration causes the rich mixture supplied to the auxiliary combustion chamber to become instantaneously over-rich. Although diluted during the compression stroke with lean mixture from the main combustion chamber, this over-rich mixture presents a phenomenon that makes spark ignition unreliable. This phenomenon is caused not by actuation of an acceleration pump or power jet or additional fuel feed system often provided on a carburetor, but by $\alpha A$ and $\alpha_T$ changing suddenly from relatively small values to large values along the curves "$b$" and "$c_1$", "$c_2$" in FIG. 2. As a result, misfire may occur in the auxiliary combustion chamber with consequent poor driveability.

While it might be possible to prevent misfire by setting each air-fuel mixture on the lean side, this is not an acceptable procedure because of the disadvantage of an overall power decrease in the engine output.

It is therefore the broad object of the present invention to provide an air-fuel correction system which is free of such disadvantages and which, when operating with three-valve dual-mixture intake engines of the type described, functions during rapid acceleration of the engine by rapid opening of the throttle valve, to apply a correction to lean the air-fuel ratio of the rich mixture immediately before ignition. It is a further object of this invention to provide such a correction device which changes λ, the ratio between the auxiliary air intake and the main air intake. Another object is to provide such a correction device which introduces secondary air. A further object is to provide a correction system for leaning the rich mixture during acceleration but which is rendered ineffective during starting operations of the engine.

In accordance with this invention, the internal combustion engine of either type described above is provided with an air-fuel ratio correction system which operates when the throttle valves 21 and 25 are opened rapidly for rapid acceleration. The air-fuel ratio of the mixture in the auxiliary combustion chamber 16 is made leaner before ignition.

Figure 5:
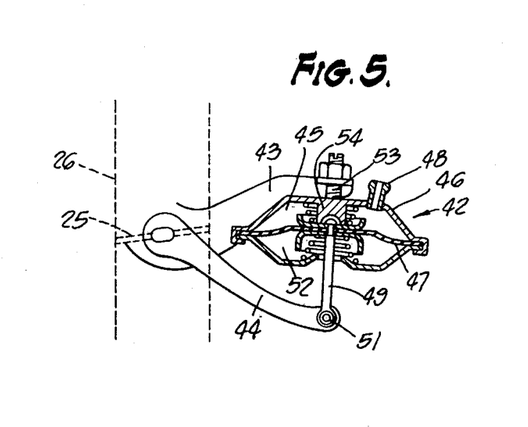
FIG. 5 is a sectional side view showing a preferred embodiment of a correction device for air intake control.

In another aspect of this invention, the correction system or device is actuated to decrease λ, the ratio between the auxiliary air intake and the main air intake from predetermined relation, and, as shown in FIG. 5, the correction device 42 is operatively positioned between a first lever 43 connected to the main throttle valve 21 and a second lever 44 connected to the auxiliary throttle valve 25. The vacuum chamber 45 is bounded on one side by the metal shell 46 and is bounded on the other side by the flexible diaphragm 47. A tubular fitting 48 communicates with the vacuum chamber 45 and is connected to an intake vacuum source in the main intake passage of the engine downstream from the main throttle valve. The central portion of the diaphragm 47 is connected by a stem 49 to the second lever 44 by the pivotal connection 51. The chamber 52 is open to atmosphere. The threaded element 53 fixed to the shell 46 is adjustably secured to the first lever 43.

When the engine is operating at low loads, the vacuum intensity in the chamber 45 is high, so that the levers 43 and 44 operate in unison, the stem 49 remaining at its minimum extension. Upon sudden acceleration of the engine, however, the vacuum intensity in the chamber 45 decreases, causing the stem 49 to project further and thereby reduce the opening of the throttle valve 25. The ratio λ decreases as the auxiliary air intake relatively decreases. This means that the amount of air-fuel mixture supplied to the auxiliary combustion chamber 16 relatively decreases, effectively preventing over-richness of the mixture adjacent the spark plug electrodes.

Figure 6:
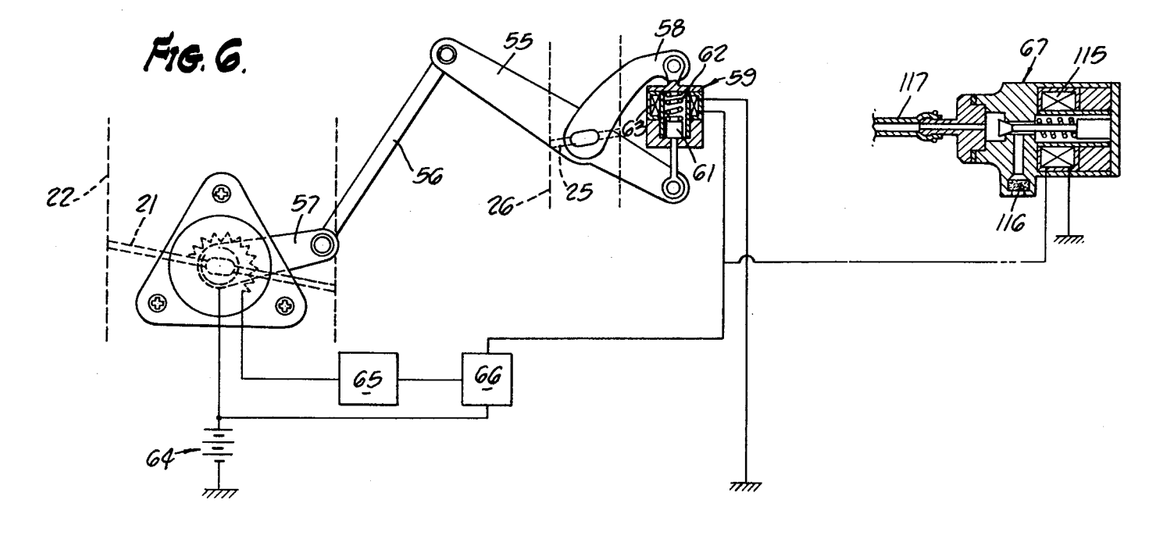
FIG. 6 is a diagram partly in section showing another form of correction device.

In the device of FIG. 6, the first lever 55 is connected by link 56 and arm 57 to operate the main throttle valve 21 in the main intake passage 22. The second lever 58 is connected to operate the auxiliary throttle valve 25 within the auxiliary intake passage 26. The control device 59 is pivotally connected between the first lever 55 and the second lever 58. The device 59 includes an armature 61 which moves against the spring 62 when electrical energy is supplied to the coil 63. This has the effect of reducing the opening of the auxiliary throttle valve 25.

In a circuit connecting the solenoid coil 63 and the power source 64 there is placed a timer switch 66 connected to a differentiation circuit 65 to detect the rate of opening of the main throttle valve 21. When the valve 21 opens rapidly, the switch 66 closes for a predetermined period of time and this causes the device 59 to change the angularity between the levers 55 and 58. The solenoid valve 67 shown in FIG. 6 is described below.

Figure 7:
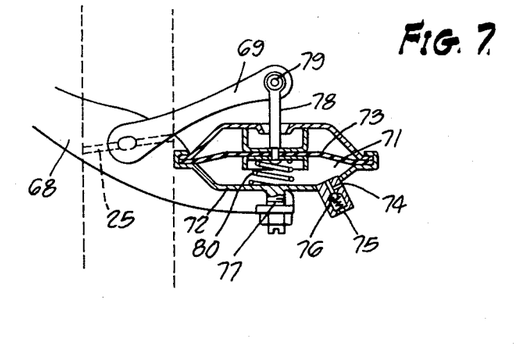
FIG. 7 is a view similar to FIG. 5 showing a modification.

The correction device shown in FIG. 7 also controls λ, the ratio of air intakes, by changing the relative positions of the first lever 68 and second lever 69. A suction chamber 71 is formed between the metal shell 72 and the flexible diaphragm 73, and this chamber 71 is connected to atmosphere through an orifice 74 and also through an opening 75 closed by a check valve 76. The shell 72 is adjustably fixed to the first lever 68 at 77, and the stem 78 fixed to the diaphragm 73 is pivotally connected to the second lever 69 at 79.

A rapid opening of the main throttle valve 21 to which the first lever 68 is connected causes air in the chamber 71 to be discharged rapidly through the check valve 76, thereby causing the auxiliary throttle valve 25 to reduce the flow of rich mixture therethrough. When the first lever 68 moves in a direction toward closing of the main throttle valve 21, the chamber 71 remains expanded by means of the spring 80.

Figure 8:
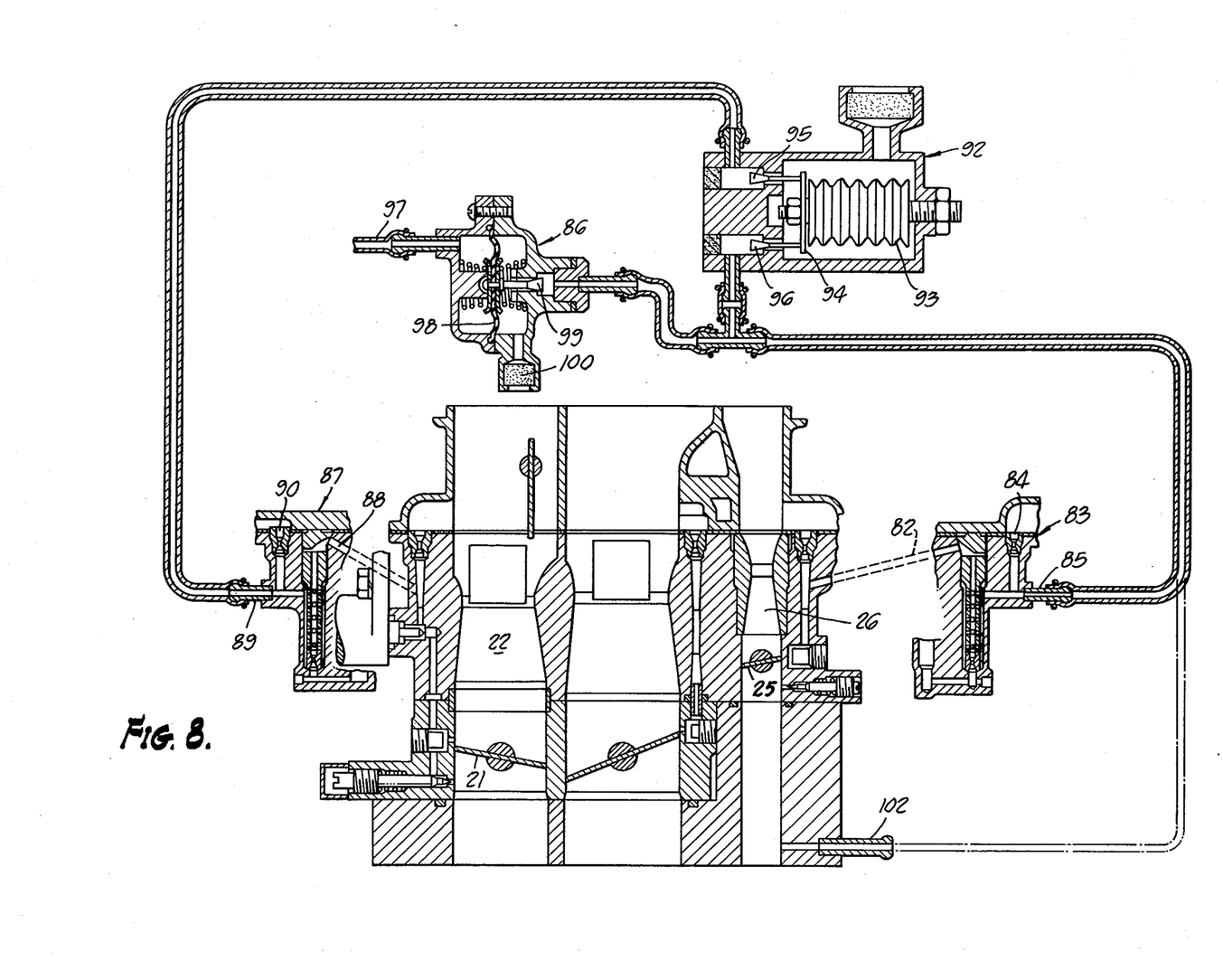
FIG. 8 is a sectional side elevation showing the carburetor portion of the engine and showing a correction device of secondary air introduction type.

The forms of the mixture correction device shown in FIGS. 5, 6, and 7 and described above accomplish the desired function by reducing the flow of rich mixture through the auxiliary throttle valve 25. In accordance with another aspect of this invention, the desired effect of leaning the air-fuel mixture in the auxiliary chamber during engine acceleration is achieved by introducing secondary air into the engine intake system. FIG. 8 shows an embodiment of this form of the invention. Secondary air is admitted into the auxiliary intake passage 26 through fuel passage 82 in the slow system of the auxiliary carburetor 83. Mounted in parallel with the air jet 84 is a secondary air inlet 85 which is connected to the atmosphere through a valve 86 that opens by rapid acceleration of the engine. Furthermore, the secondary air inlet 85 is connected to a valve 92 which introduces additional atmospheric air into an air jet passage through the air inlet 85 in proportion to altitude for compensating the air-fuel ratio of the rich mixture. Accordingly, rich mixture produced in the auxiliary intake passage 26 is slightly diluted, and as a result the mixture in the auxiliary combustion chamber 16 is corrected for over-richness.

A similar system may be provided for admitting secondary air into the main intake passage 22, either alone or in combination with the secondary air inlet to the auxiliary intake passage 26. The main carburetor 87 is provided with a fuel passage 88 in the slow system of the carburetor, and a secondary air inlet 89 is positioned in parallel with the air jet 90. The inlet 89 is connected to the valve 86 through the valve 92 which operates as described above. The bellows member 93 is subjected to atmospheric air pressure in proportion to altitude. A movalbe plate 94 operated by the bellows 93 moves valve elements 95 and 96 to control intoduction of atmospheric air into the secondary air inlets 85 and 89.

The suction line 97 of the valve 86 is connected to receive engine intake vacuum. The flexible diaphragm 98 controls the position of the valve element 99 and thereby controls the flow of atmospheric air from the filter 100 to the secondary air inlet 85 and 89.

If desired, a secondary air inlet 102 leading to the auxiliary intake passage 26 may be connected to the valve 86 and to the valve 92, instead of introducing secondary air through the inlet 85. In a similar fashion, a secondary air inlet (not shown) may be provided directly into the main intake passage 22, and connected to the valve 86 and 92, instead of employing the secondary air inlet 89.

Figure 9:
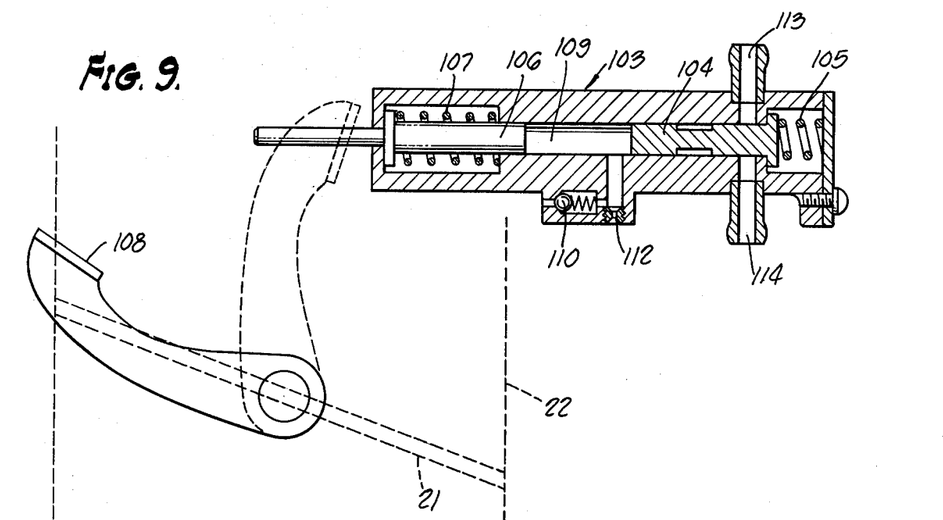
FIG. 9 is a sectional side elevation showing a preferred form of valve used in connection with the device of FIG. 8.

The valve 86 may be replaced by the sliding valve 103 shown in FIG. 9. The valve 103 includes a sliding valve member 104 which moves against a spring 105. A plunger 106 moves against the spring 107 when contacted by the lever 108 fixed to the main throttle valve 21. A chamber 109 between the plunger 106 and the sliding valve member 104 is connected to atmosphere through the check valve 110 and through the orifice 112 in parallel therewith. When the main throttle valve 21 is opened gradually, the plunger 106 moves gradually against the spring 107 and air in the chamber 109 escapes through the orifice 112, the sliding valve member 104 being maintained in closed position by force of the spring 105. However, when the throttle valve 21 is opened rapidly, the lever 108 moves the plunger 106 quickly so that increase in air pressure in the chamber 109 acts on the sliding valve member 104 to move it against the force of the spring 105 to open position, thereby connecting the inlet 113 to the outlet 114. This allows the introduction of secondary air into one or both of the intake passages of the engine. The valve 86 shown in FIG. 8 or the valve 103 shown in FIG. 9 may be replaced by an electromagnetic response valve 67 as shown in FIG. 6. The solenoid coil 115 is connected in parallel with the solenoid coil 63 of the control member 59 and it is so formed that it opens when energized by rapid opening of the throttle valve 21, admitting atmospheric air through the filter 116 and into the conduit 117. The valve may also comprise an electromagnetic response valve connected to a power source through a switch to detect the engine's speed, and through a switch to detect actuation position of the accelerator.

Figure 10:
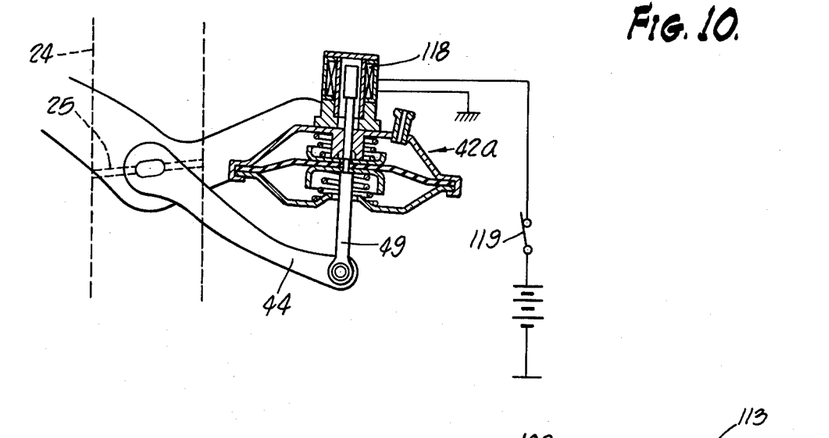
FIG. 10 is a diagram partly in section showing a solenoid operated valve employed in a counter-actuation system.

It is desirable to construct the mixture correction device so that it does not operate under very low engine load, or under rapid opening of the throttle valve during the starting operation of the engine. As shown in FIG. 10, the valve 42a is similar to the valve 42 shown in FIG. 5, except that it provided with an electromagnetic solenoid 118 that is energized and actuated by closing of the starter switch 119 of the engine, to move the stem 49 to a retracted position.

Figure 11:
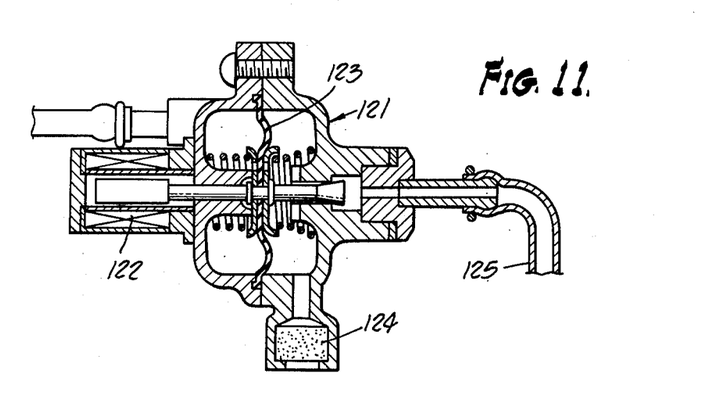
FIG. 11 is a sectional side elevation of another form of solenoid valve.

FIG. 11 shows a valve 121 which may be substituted for the valve 86 in FIG. 8; the valve 121 is provided with an electromagnetic solenoid 122 which is actuated by closing of the starter switch 119 of the engine and acts to fix the diaphragm 123 in retracted position, closing the valve and preventing flow of supplementary air through the filter 124 and conduit 125.

It will be understood from the foregoing explanation that, in accordance with the present invention, a correction system is provided that actuates upon rapid acceleration of the engine to prevent an over-rich mixture from developing in the auxiliary chamber, which over-rich mixture could not be reliably ignited by the spark plug, and thereby causing misfire and poor driveability and causing discharge of excessive pollutants into the atmosphere. Furthermore, as explained above, the invention contemplates either the decrease in ratio of air intakes or the introduction of secondary air, and in either case to obtain good driveability without discharge of excessive pollutants into the atmosphere. Moreover, either of these systems can be rendered inoperative during the starting operation of the engine.

Having fully described my invention, it is to be understood that I am not to be limited to the details herein set forth but that my invention is of the full scope of the appended claims.

I claim:

1. In an internal combustion engine in which each piston is provided with a main combustion chamber having an auxiliary combustion chamber associated therewith and connected thereto by means of a torch opening, and a spark plug associated with each auxiliary combustion chamber, the improvement comprising, in combination: means including a main throttle valve for supplying a relatively lean mixture to each of said main combustion chambers, means including an auxiliary throttle valve for supplying a relatively rich mixture to each of said auxiliary combustion chambers, and correction means responsive to sudden acceleration of the engine for reducing the richness of the mixture in each auxiliary combustion chamber at the time of ignition.

2. The combination set forth in claim 1 in which said correction means operate to reduce the opening of the auxiliary throttle valve.

3. The combination set forth in claim 1 in which said correction means operates to introduce secondary air into one of or both of auxiliary and main combustion chambers.

4. The combination set forth in claim 1 in which means are provided for rendering said correction means inoperative during starting operation of the engine.

5. In an internal combustion engine in which each piston is provided with a main combustion chamber having an auxiliary combustion chamber associated therewith and connected thereto by means of a torch opening, and a spark plug associated with each auxiliary combustion chamber, the improvement comprising, in combination; means including a main throttle valve for supplying a relatively lean mixture to each of said main combustion chambers, means including an auxiliary throttle valve for supplying a relatively rich mixture to each of said auxiliary combustion chambers, and correction means associated with at least one of said throttle valves and responsive to sudden acceleration of the engine to reduce the richness of the mixture supplied to at least one of said combustion chambers.

6. The combination as set forth in claim 5 in which said correction means are provided for reducing the opening of the auxiliary throttle valve during sudden acceleration of the engine.

7. The combination set forth in claim 5 in which said correction means operates to introduce secondary air into one of or both of auxiliary and main combustion chambers.

8. The combination set forth in claim 5 in which means are provided for rendering said correction means inoperative during starting operation of the engine.

9. In an internal combustion engine having a piston provided with a main combustion chamber and an auxiliary combustion chamber connected thereto by means of a torch opening, a spark plug associated with the auxiliary combustion chamber, the improvement comprising, in combination: means including a main throttle valve for supplying a relatively lean mixture to said main combustion chamber, means including an auxiliary throttle valve for supplying a relatively rich mixture to said auxiliary combustion chamber, linkage means connecting said throttle valves for dependent movement, and correction means associated with said linkage means and responsive to sudden acceleration of the engine to reduce the opening of the auxiliary throttle valve.

10. The combination set forth in claim 9 in which said correction means includes an expansible chamber subjected to engine intake vacuum.

11. The combination set forth in claim 9 in which said correction means includes an electrically operated extension device, and means responsive to rapid opening of said main throttle valve for energizing said extension device.

12. The combination set forth in claim 9 in which said correction means includes an expansible chamber, means including an orifice connecting said expansible chamber to atmosphere, and a check valve in parallel with said orifice permitting flow of air out of said expansible chamber.

13. The combination set forth in claim 9 together with means for rendering said correction means inoperative during starting operation of the engine.

14. In an internal combustion engine having a piston provided with a main combustion chamber and an auxiliary combustion chamber connected thereto by means of a torch opening, a spark plug associated with the auxiliary combustion chamber, the improvement comprising, in combination: means for supplying a relatively lean mixture to said main combustion chamber, means for supplying a relatively rich mixture to said auxiliary combustion chamber, and correction means responsive to sudden acceleration of the engine acting to introduce secondary air into one of said combustion chambers.

15. The combination set forth in claim 14 in which the secondary air in introduced into said auxiliary combustion chamber.

16. The combination set forth in claim 14 in which the secondary air is introduced into both of said combustion chambers.

17. The combination set forth in claim 14 together with means for rendering said correction means inoperative during starting operation of the engine.

* * * * *